US012162601B2

(12) United States Patent
Tulloch et al.

(10) Patent No.: US 12,162,601 B2
(45) Date of Patent: Dec. 10, 2024

(54) FITTINGS FOR CONNECTING STRUCTURES

(71) Applicant: Airbus Operations Limited, Bristol (GB)

(72) Inventors: William Tulloch, Bristol (GB); Pat Broomfield, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 370 days.

(21) Appl. No.: 17/294,199

(22) PCT Filed: Oct. 31, 2019

(86) PCT No.: PCT/EP2019/079864
§ 371 (c)(1),
(2) Date: May 14, 2021

(87) PCT Pub. No.: WO2020/099138
PCT Pub. Date: May 22, 2020

(65) Prior Publication Data
US 2022/0009614 A1    Jan. 13, 2022

(30) Foreign Application Priority Data
Nov. 16, 2018 (GB) .................................... 1818674

(51) Int. Cl.
*B64C 3/32* (2006.01)
*B64C 3/18* (2006.01)
*B64D 27/40* (2024.01)

(52) U.S. Cl.
CPC ................ *B64C 3/32* (2013.01); *B64C 3/185* (2013.01); *B64D 27/40* (2024.01); *B64D 27/402* (2024.01)

(58) Field of Classification Search
CPC ........... B64C 3/32; B64C 3/185; B64D 27/26; B64D 2027/264
See application file for complete search history.

(56) References Cited

U.S. PATENT DOCUMENTS

2009/0200418 A1* 8/2009 Beaufort ................ B64D 27/26
244/54
2010/0127118 A1* 5/2010 Combes ................. B64D 27/26
60/797

(Continued)

FOREIGN PATENT DOCUMENTS

DE    299 13 904    12/2000
FR    2576279 A1 * 7/1986 ........... B64C 31/028

(Continued)

OTHER PUBLICATIONS

Translation of FR2887522A1 (Year: 2006).*

(Continued)

*Primary Examiner* — Richard Green
*Assistant Examiner* — Steven J Shur
(74) *Attorney, Agent, or Firm* — Nixon & Vanderhye P.C.

(57) ABSTRACT

A fitting for connecting a first aircraft structure to a second aircraft structure is disclosed including a first substantially planar surface, a second substantially planar surface, a body, and a cavity in the body configured to retain a captive nut. The body connects the first surface to the second surface such that the first surface is at an angle of less than or equal to 90° to the second surface. The cavity is configured such that a captive nut retained therein is adjacent the first surface and the second surface.

17 Claims, 5 Drawing Sheets

(56) References Cited

U.S. PATENT DOCUMENTS

2013/0091691 A1\* 4/2013 Oetlinger ................ F16B 7/187
411/366.1
2018/0186462 A1 7/2018 Brochard

FOREIGN PATENT DOCUMENTS

FR          2887522 A1 \* 12/2006  ............ B64D 27/18
WO       WO-0110270 A1 \*  2/2001  ............ F16B 5/0614
WO       2018/0192787      10/2018

OTHER PUBLICATIONS

Translation of WO2001010270A1 (Year: 2001).\*
FR2576279A1 Translation (Year: 1986).\*
International Search Report for PCT/EP2019/079864 dated Dec. 17, 2019, 7 pages.
Written Opinion of the ISA for PCT/EP2019/079864 dated Dec. 17, 2019, 11 pages.

\* cited by examiner

FITTINGS FOR CONNECTING STRUCTURES

CROSS REFERENCE TO RELATED APPLICATIONS

The present application is a National Phase of International Application Number PCT/EP2019/079864 filed Oct. 31, 2019, which designated the U.S. and claims priority benefits from Great Britain Application Number GB 1818674.2 filed Nov. 16, 2018, the entire contents of each of which are hereby incorporated by reference.

TECHNICAL FIELD

The present invention relates to a fitting for connecting a first aircraft structure to a second aircraft structure, to an assembly of two structures connected by a bracket, and to an aircraft comprising such an assembly.

BACKGROUND

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing.

Conventionally, an engine mounting pylon is attached to a wing box by a set of couplings interposed vertically between the wing box and the primary structure of the pylon. These couplings transmit forces between the engine mounting pylon and the wing box, including the thrust loads generated by the engine. Known designs of such couplings require the top surface of the engine mounting pylon to be spaced apart vertically from the lower surface of the wing box, and are therefore not suitable for use with very large diameter engines.

SUMMARY

A first aspect of the present invention provides a fitting for connecting a first aircraft structure to a second aircraft structure. The fitting comprises a first substantially planar surface, a second substantially planar surface, a body, and a cavity in the body configured to retain a captive nut. The body connects the first surface to the second surface such that the first surface is at an angle of less than or equal to 90° to the second surface. The cavity is configured such that a captive nut retained therein is adjacent the first surface and the second surface.

Optionally, the first surface is at an angle of less than or equal to 85° to the second surface.

Optionally, the cavity is configured such that a captive nut retained therein is substantially the same distance from the first surface as from the second surface.

Optionally, the cavity is configured such that the distance between a captive nut retained therein and the first surface and the distance between the captive nut retained therein and the second surface are each less than the diameter of a stem of a fastener configured to engage with the captive nut retained therein.

Optionally, the second surface is connected to the cavity by a bore, to enable a fastener to extend through the second surface and engage with a captive nut retained in the cavity.

Optionally, one or both of the first surface and the second surface comprises mounting features for facilitating attachment of the fitting to an aircraft structure. Optionally, the mounting features comprise fastener holes.

Optionally, the fitting further comprises a captive nut retained in the cavity. Optionally, the captive nut is a barrel nut.

Optionally, the fitting is configured to be provided in a corner between a forward-facing surface of a front spar of an aircraft wing and forwardly-extending structure of the aircraft wing, such that the first substantially planar surface is in contact with the forward-facing surface of the front spar and the second substantially planar surface is in contact with the forwardly extending structure, when the fitting is installed on the aircraft wing. Optionally, the first aircraft structure is the front spar. Optionally, the first surface is configured to be fixedly attached to the forward-facing surface of the front spar. Optionally, the second surface is configured to be fixedly attached to the forwardly-extending structure.

A second aspect of the present invention provides an assembly comprising a first structure, a second structure, a bracket, and a fastener. The bracket comprises a first arm fixedly attached to the first structure; a second arm connected to the first arm such that an angle of less than or equal to 90° is enclosed therebetween; and a captive nut retained between the first arm and the second arm. The fastener extends through the second structure and is engaged with the captive nut to prevent movement of the first structure and the second structure along the axial direction of the fastener.

Optionally, the captive nut is disposed in a corner of the bracket where the first arm meets the second arm.

Optionally, one or both of the first arm and the second arm is attached to the first structure by one or more fasteners.

Optionally, the assembly further comprises one or more intermediate structures disposed between the second arm of the bracket and the second structure, and the fastener additionally passes through the one or more intermediate structures.

Optionally, the bracket is a fitting according to the first aspect.

A third aspect of the present invention provides an aircraft comprising an assembly according to the second aspect.

Optionally, the first structure is a wing box and the second structure is an engine mounting pylon.

Optionally, the engine mounting pylon and the wing box are close-coupled.

Optionally, the aircraft further comprises an Ultra High-Bypass Ratio engine mounted on the engine mounting pylon.

BRIEF DESCRIPTION OF THE DRAWINGS

Embodiments of the invention will now be described, by way of example only, with reference to the accompanying drawings, in which:

FIG. 1b is a schematic bottom view of the example fitting of FIG. 1a;

FIG. 4b is a top view of one of the fittings comprised in the assembly of FIG. 4a;

FIG. 4c is a side perspective view of the example assembly of FIG. 4a; and

DETAILED DESCRIPTION

Figure 1A:
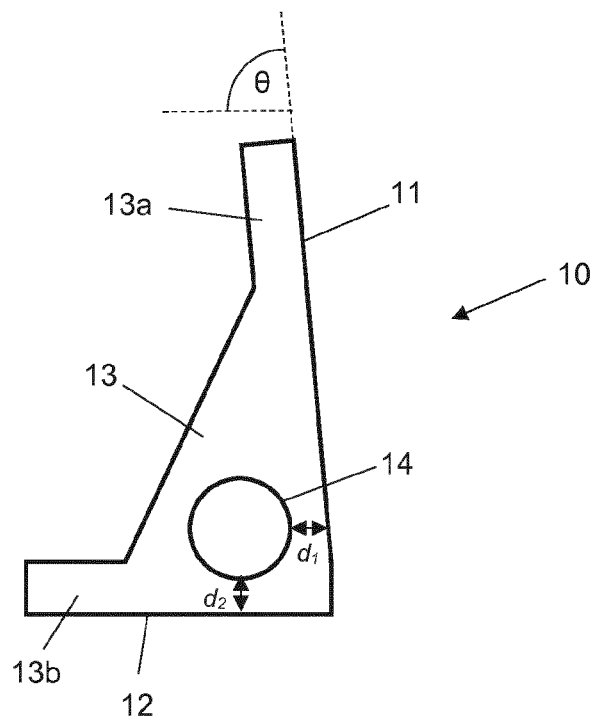
FIG. 1a is a schematic cross-section through an example fitting according to the invention.

The examples described below each relate to connecting a first structure to a second structure by means of a fitting (or bracket). The terms fitting and bracket are used interchangeably. In each example the fitting comprises a first surface and a second surface. One or both of the surfaces is configured to be fixedly attached to the first structure. The first surface is at an angle of less than or equal to 90° to the second surface. A cavity in the fitting is configured to retain a captive nut, such that the captive nut is adjacent both the first surface and the second surface. For example, the captive nut may be disposed in a corner defined by the first surface and the second surface.

Example fittings (or brackets) according to the invention are suitable for attaching an engine mounting pylon to an aircraft wing box. An engine mounting pylon may generally be attached to a wing box by a forward coupling and an aft coupling. The example fittings according to the invention may be especially suitable for use as part of a forward coupling between an engine mounting pylon and a wing box. The forward coupling between an engine mounting pylon and a wing box supports the weight of the pylon, and may also transmit thrust from the engine to the wing. For the purposes of this specification, the terms forward and rearward (or aftward), up, down and the like are defined with respect to a normal operational orientation of the structures referred to—for aircraft structures this will be the normal direction of travel of the aircraft during flight.

WO/2018/192787 discloses example assemblies each comprising an aircraft wing and an engine mounting pylon fixed under the wing. WO/2018/192787 proposes a forward coupling that is suitable for achieving a close coupling between the pylon and the wing. The forward coupling described in WO '787 uses a line of bolts which pass through an upper spar of the pylon and a lower cover of the wing. The wing lower cover is not strong enough to support the weight of the pylon and engine, so a set of brackets are attached to the front face of the front spar, for the bolts to anchor to such that loads are transmitted into the front spar.

The bolts of the WO '787 forward coupling engage with captive nuts retained by the primary structure of the pylon and must therefore be tightened from above. In the examples illustrated in WO '787, the web of the front spar is perpendicular to the lower cover. However; in many wing structures the angle enclosed between the front spar and the lower cover will be acute, due to the shape of the aerofoil profile. The bolt and fitting arrangement of WO '787, if adapted for use on a wing structure having an acute angle between the front spar web and lower cover, would require the bolts to be moved away (in the chordwise direction) from the front spar web in order to permit access to the bolt heads by a tensioning tool. The greater the chordwise distance between the bolts and the front spar, the greater the moment load on the fittings. In this scenario, the fittings of WO '787 would need to be strong enough to react this moment load in addition to the vertical load due to the weight of the pylon and engine, leading to an increase in size, weight and cost of the fittings.

The example fittings according to the invention seek to address these issues, and are especially suitable for use with a wing structure where there is an acute angle between the front spar web and lower cover. In particular, the fittings according to the invention include a captive nut, enabling the fasteners which are used in conjunction with the fittings to be inserted and tensioned from below. Access to the fastener heads is therefore not restricted by the angle of the front spar web, meaning that the fasteners can be located very close to the front spar web. Consequently, the moment load on the fittings is reduced as far as possible, and the fittings can be significantly smaller and lighter than those described in WO '787, for all wing box configurations. A further advantage of inserting and tensioning the fasteners from below is that systems can be installed into the wing leading edge structure, and fully tested, before the pylon is joined to the wing. This is because minimal or no access is required to the wing side of the coupling during the joining process. This may significantly simplify and speed-up construction of the aircraft.

Figure 1B:
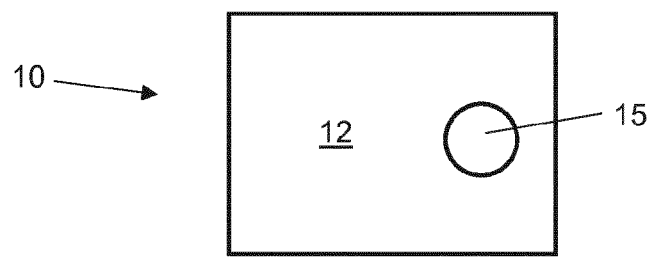

FIGS. 1a and 1b show an example fitting 10 according to the invention. FIG. 1a is a cross-section through the fitting 10 and FIG. 1b is a view from below (with regard to the orientation of FIG. 1a) of the fitting 10. The fitting 10 comprises a first surface 11 and a second surface 12. The first and second surfaces 11, 12 are connected by a body 13. The fitting 10 also comprises a cavity 14 in the body 10 which is configured to retain a captive nut. In the illustrated example the first surface 11 is an external surface of a first arm 13a of the fitting 10 and the second surface 12 is an external surface of a second arm 13b of the fitting 10. The body 13 comprises the first arm 13a and the second arm 13b, plus a buttress portion to maintain the relative positions of the first and second arms 13a and 13b and provide sufficient material to define the cavity 14. The first arm 13a and the second arm 13b are connected such that they enclose the angle θ therebetween.

Each of the first surface and the second surface 11, 12 is substantially planar. The first surface 11 is at an angle θ to the second surface 12. θ is less than or equal to 90°. θ may be an acute angle. In the particular illustrated example, θ is approximately 85°. The value of θ is selected to match the angle between the front face of the front spar web and lower cover of a wing box to which the fitting 10 is to be attached. One or both of the first surface 11 and the second surface 12 may comprise mounting features for facilitating attachment of the fitting 10 to a structure. Such mounting features may comprise, for example, fastener holes suitable for enabling the surface to be fixedly attached to a structure using fasteners. The first and second surfaces 11, 12 may be configured to be attached to the same structure, or may be configured to be attached to different structures. In some examples, the fitting 10 is configured to be provided in a corner between a forward-facing surface of a front spar of an aircraft wing and forwardly-extending structure (such as a spar flange, a lower wing cover, or the like) of the aircraft wing. In such examples the first surface 11 is in contact with the forward-facing surface of the front spar and the second surface 12 is in contact with the forwardly extending structure when the fitting 10 is installed on the aircraft wing.

The body 13 may comprise a solid portion of material. The first arm 13a, second arm 13b and buttress portion may all be integrally formed. Suitable materials from which to form the body 13, for a wing-pylon forward coupling application, include titanium and steel. The shape of the body 13 forms the first and second surfaces 11, 12—in other words, the first and second surfaces 11, 12 are external surfaces of the body 13. The body 13 may be formed by forging, machining, additive manufacturing, or any other suitable manufacturing process known in the art.

The cavity 14 is configured to retain a captive nut of suitable size and configuration for the intended application of the fitting 10. In the illustrated example, the cavity 14 comprises a bore configured to retain a barrel nut. In this example the bore extends out of a side face of the body, so that the barrel nut can be inserted into the bore after manufacture of the body 13. Other examples are possible in which the captive nut is inserted during manufacture of the body 13, in which case the cavity 14 need not extend to an external surface of the body 13. The particular example fitting 10 further comprises a bore 15 connecting the cavity 14 to the second surface 12. The bore 15 enables a fastener to extend through the second surface 12 and engage with a captive nut retained in the cavity 14. The diameter of the bore 15 may be substantially equal to the diameter of a stem of a fastener intended to be used with the fitting 10. The diameter of the bore 15 is less than the diameter of the cavity 14.

The cavity 14 is configured such that a captive nut retained therein is adjacent both the first surface 11 and the second surface 12. By "adjacent" it is meant that a distance $d_1$ between the captive nut and the first surface 11 and a distance $d_2$ between the captive nut and the second surface 12 are both small compared to the dimensions of the captive nut. For example, $d_1$ and $d_2$ may each be less than the diameter of the stem of a fastener configured to engage with the captive nut. $d_1$ and $d_2$ may (but need not) be substantially equal such that the captive nut is substantially the same distance from the first surface as from the second surface. Preferably at least $d_1$ is as small as possible whilst achieving a desired strength of the fitting 10, in order to minimize the moment load on the fitting 10 during operation on an aircraft. In the particular example of FIGS. 1a and 1b, the cavity 14 is configured such that a captive nut retained therein is between the first arm 13a and the second arm 13b. In particular, the captive nut is disposed in a corner of the fitting 10 where the first arm 13a meets the second arm 13b.

Figure 2:
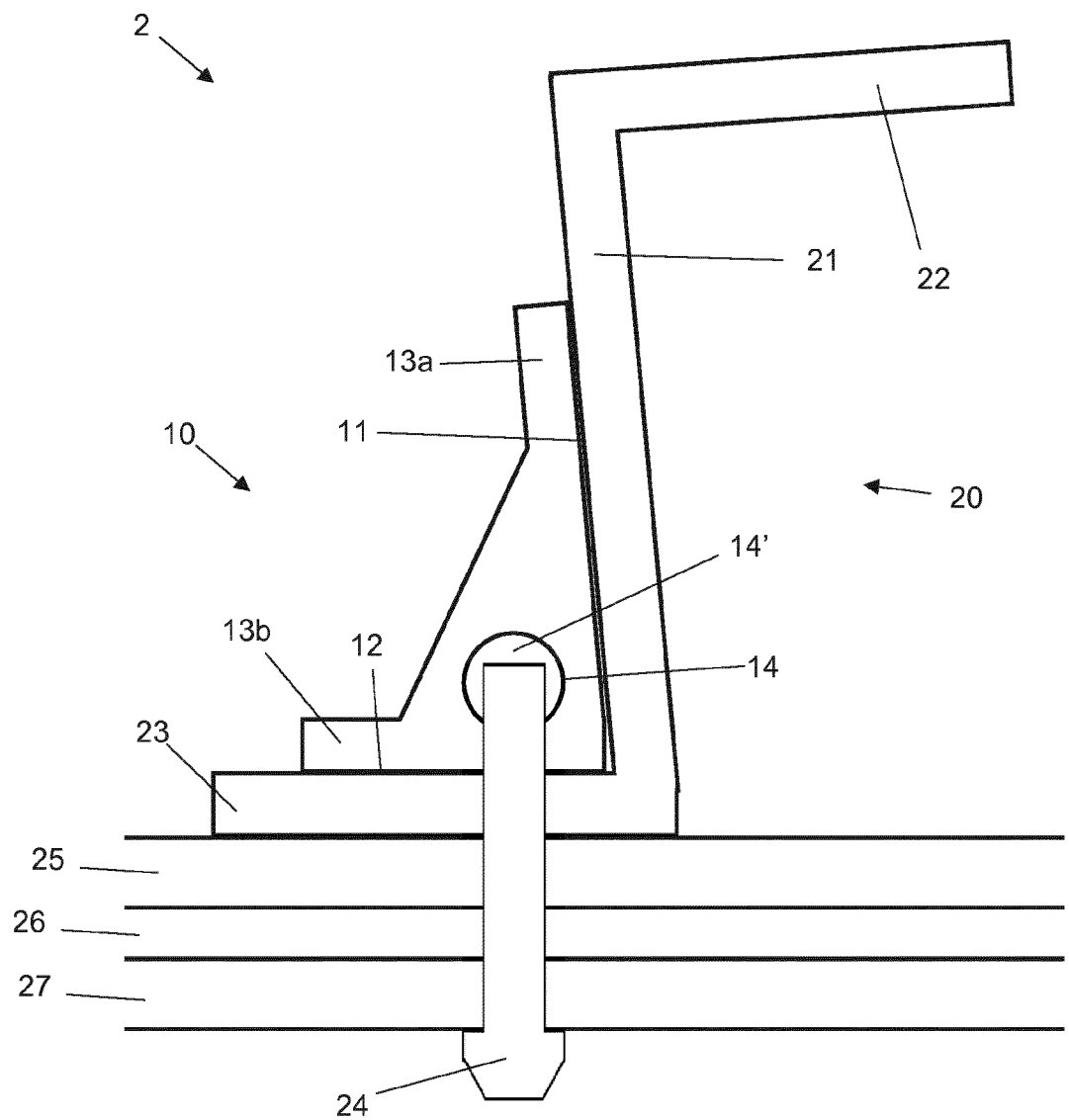
FIG. 2 is a schematic cross-section through an example assembly comprising the fitting of FIGS. 1a and 1b.

FIG. 2 shows an assembly 2 comprising a first structure 20, a second structure 27, and two intermediate structures 25, 26. The first structure 20, second structure 27 and intermediate structures 25, 26 are held together by a fastener 24 engaged with the example fitting 10 of FIGS. 1a and 1b. A captive nut 14' is retained within the cavity 14 of the fitting 10. A fastener 24 extends through at least the second structure 27 and is engaged with the captive nut 14' to prevent movement of the first structure 20 and the second structure 27 along the axial direction of the fastener 24. In the particular illustrated example, the fastener also passes through the first structure 20 and each of the intermediate structures 25, 26. Other examples are possible in which no intermediate structures are present, or a different number of intermediate structures are present. Other examples are also possible in which the first structure 20 has a different configuration (e.g. a "C" shape rather than an "S" shape) such that the fastener does not pass through the first structure 20.

The first arm 13a of the fitting 10 is fixedly attached to the first structure 20 by any suitable mechanism (e.g. one or more fasteners) (not shown). In the illustrated example, the first structure 20 is an aircraft wing spar having a web part 21 configured to be substantially vertical when the aircraft is on the ground. An upper flange 22 of the spar extends afterwards from a top end of the web part 21, and a lower flange 23 extends forwards from a bottom end of the web part 21. An acute angle is enclosed between the forward surface of the web part 21 and the lower flange 23. The angle between the forward surface of the web part 21 and the lower flange 23 is substantially equal to the angle θ between the first and second surfaces 11, 12 of the fitting 10.

In the illustrated example the fitting 10 is configured to sit between the web part 21 and the lower flange 23. The second arm 13b of the fitting 10 is fixedly attached to the lower flange 23 by any suitable mechanism (e.g. one or more fasteners) (not shown). It is not essential for the second arm 13b of the fitting 10 to be fixedly attached to the first structure 20. Other examples are possible in which the first structure does not comprise a forwardly extending flange, in which case only the first arm 13a of the fitting 10 may be fixedly attached to the first structure 20.

The attachment of the fitting 10 to the first structure 20, whether by just the first arm 13a or by both of the first and second arms 13a, 13b, is configured to transmit load from the fastener 24 to the first structure 20. The load may be, for example, the weight of the second structure. In the illustrated example, the second structure 27 is an upper spar of an engine mounting pylon, so the load transferred by the fastener 24 to the first structure 20 is primarily the combined weight of the pylon and an engine mounted thereon. In some examples a reinforcing structure is provided adjacent the first structure 20, to react the loads transmitted through the fastener 24 and fitting 10, and thereby to reduce the load reacted by the spar web 21. In the illustrated example, such a reinforcing structure could take the form of a plate or fitting provided on the rear face of the spar web 21, in which case the attachment mechanism attaching the first arm 13a of the fitting 10 to the first structure 20 would be configured to transmit load to the reinforcing structure. For example, if one or more fasteners are used to attach the first arm 13a to the spar web 21, the fasteners would extend through the spar web 21 and the adjacent reinforcing structure.

In the illustrated example, the first intermediate structure 25 is a lower cover panel of a wing box, and the second intermediate structure 26 is a reinforcing structure. As with the reinforcing structure discussed above, the reinforcing structure 26 is configured to reduce the load that must be reacted by the lower cover 25. In some examples multiple fittings 10 and fasteners 24 may be comprised in a particular coupling. In such examples the reinforcing structure 26 (and/or any reinforcing structure provided behind the spar web 21) may be common for all of the fittings 10 and fasteners 24. In this way the reinforcing structure functions to spread the load of the engine and pylon across a relatively large area of the wing box.

Figure 3:
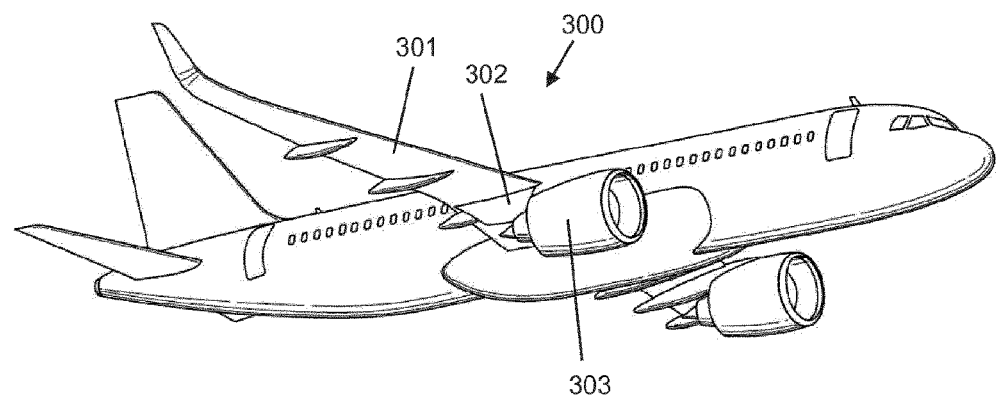
FIG. 3 is a perspective view of an example aircraft comprising an example assembly according to the invention.

FIG. 3 shows an example aircraft 300 which comprises one or more assemblies according to the invention. In particular, the aircraft 300 comprises a wing 301, to which an engine mounting pylon 302 is attached. An Ultra-High-Bypass Ratio (UHBR) engine 303 is mounted on the engine mounting pylon 302. The engine mounting pylon 302 is close-coupled to the wing 301. A forward coupling between engine mounting pylon 302 and the wing 301 comprises an example fitting according to the invention (e.g. the example fitting 10 described above) comprised in an example assembly according to the invention (e.g. the example assembly 2 described above). The aircraft 300 also includes a further wing, engine mounting pylon and UHBR engine. The further wing and engine mounting pylon may be connected in the same manner as the wing 301 and pylon 302.

The aircraft 300 may also include one or more further fittings and/or assemblies according to the invention, which may connect together aircraft structures other than pylons and wings.

Figure 4A:
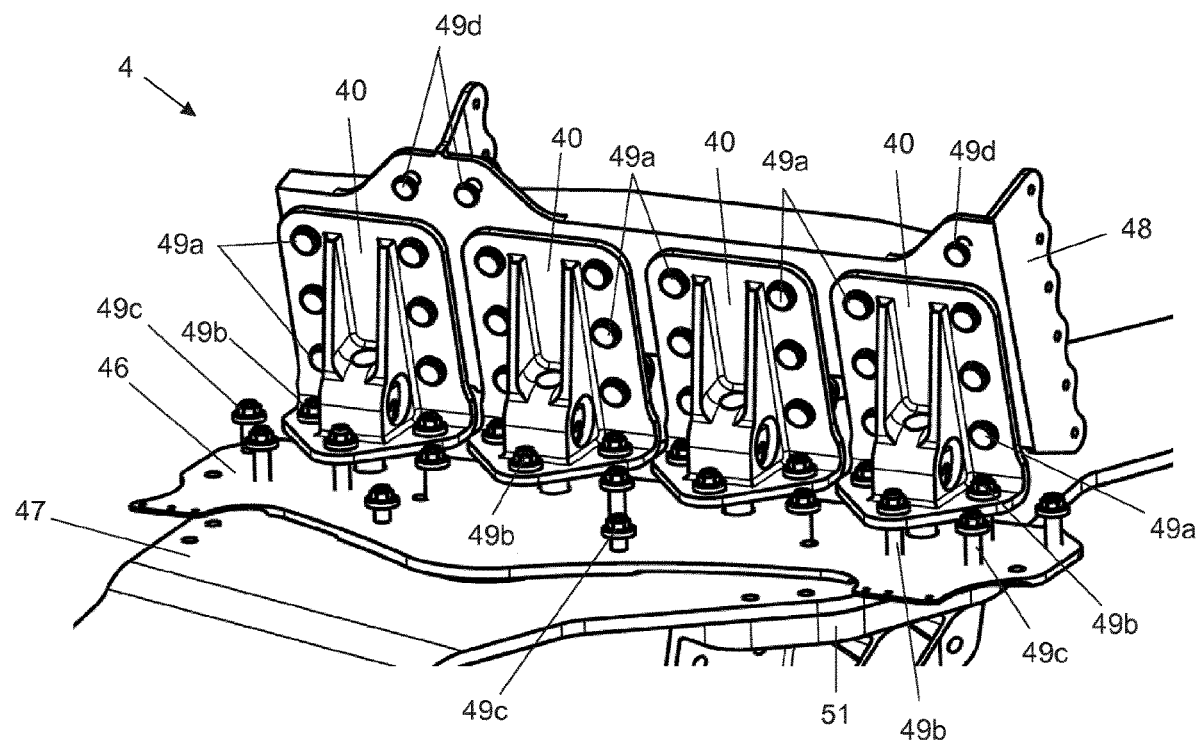
FIG. 4a is a front perspective view of a further example assembly according to the invention.
Figure 4B:
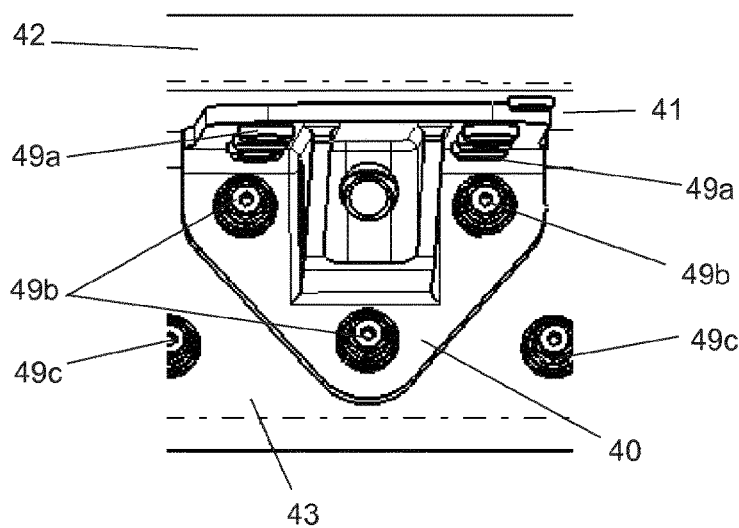
Figure 4C:
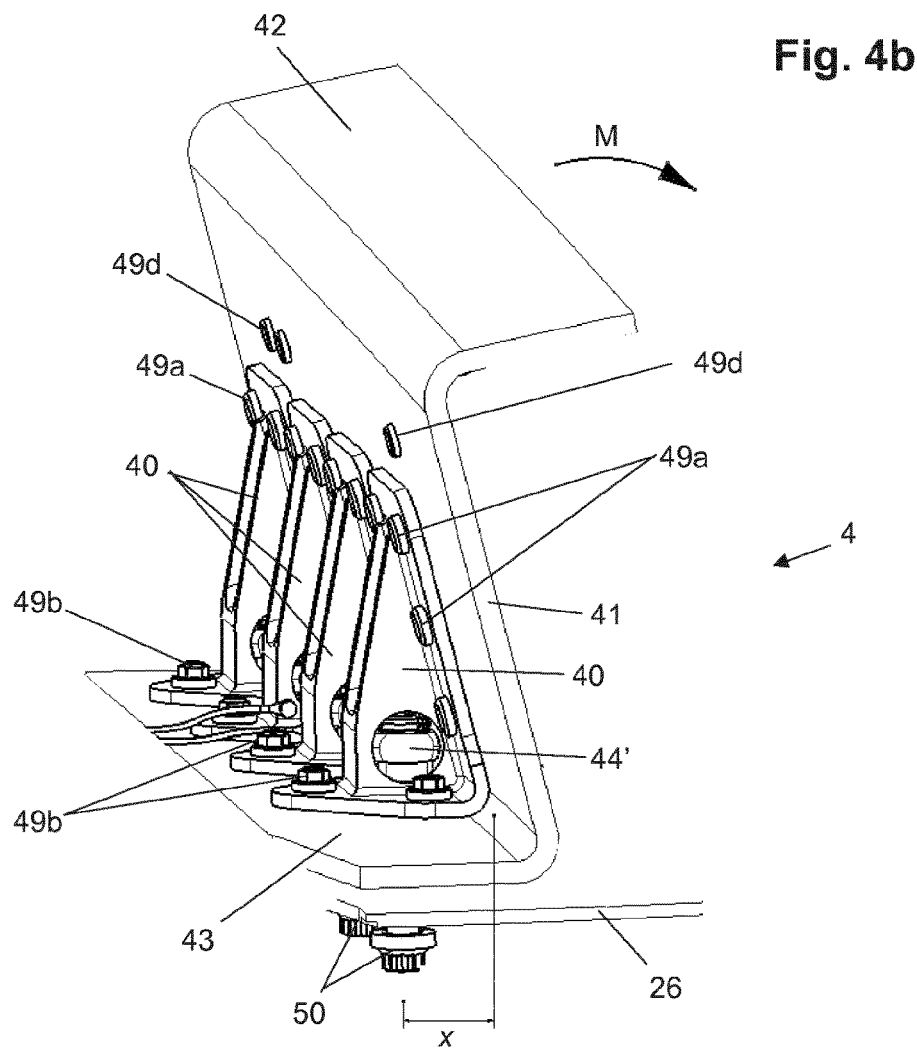

FIGS. 4*a*-*c* are different views of an example forward coupling 4 between an engine mounting pylon and a wing box, which is suitable for use on the aircraft 300. The coupling 4 comprises assemblies having the same general features as the example assembly 2 described above. The coupling 4 may itself be considered to be an assembly according to the invention.

The wing box comprises a Z-shaped front spar having a spar web 41, a rearwardly-extending upper flange 42, and a forwardly-extending lower flange 43, all of which are integrally formed. The front spar may be formed from a composite material. The wing box also comprises upper and lower cover panels, which are omitted from FIGS. 4*a*-*c* for the sake of clarity, and a rear spar (not visible in any of FIGS. 4*a*-*c*). The front spar is omitted from FIG. 4*a* to more clearly show some of the other components of the coupling 4, but is present in FIGS. 4*b* and 4*c*.

The engine mounting pylon comprises a box structure bounded by an upper spar 47 as well as side panels and a lower spar (not shown). The coupling 4 is wider than the main box structure of the pylon, so a bracket 51 is fixedly attached to each side wall of the pylon box (only one bracket 51 is partially visible in FIG. 4*a*) for the outer fittings of the coupling 4 to attach to. The rest of the pylon structure is not shown and is not relevant to the functioning of the coupling 4. A first reinforcing plate 46 is provided between the pylon upper spar 47 and the lower cover of the wing box. A second reinforcing plate 48 is provided behind the spar web 41. The second reinforcing plate 48 is attached to the spar web 41 by fasteners 49*d*, which may be of the same general type as fasteners 49*a* used to attach the fitting 40 to the spar web 41.

The coupling 4 comprises four fittings 40, each of which has the same general features as the example fitting 10 described above. FIG. 4*b* is a top view of one of the fittings 4 and the surrounding region of the front spar. The central two fittings 40 attach to the top spar 47 of the pylon, whilst the outer two fittings 40 attach to the brackets 51. Each fitting 40 retains a captive barrel nut 44'. The barrel nuts 44' are located as close as possible to the spar web (that is, the distance x indicated on FIG. 4*c* is as small as possible) so that the moment load (represented by the arrow M in FIG. 4*c*) experienced by the fittings 40 and spar web is as small as possible.

A fastener 50 (in the form of a tension stud or bolt) is engaged with each of the barrel nuts 44' and passes through either the pylon upper spar 47 (for the central two fasteners 50) or one of the brackets 51 (for the outer two fasteners 50), and the first reinforcing plate 46, lower cover, lower flange 43 and a lower arm of the respective fitting 40, to prevent separation of these components along the axial direction of the fastener 50. The heads of the fasteners 50 are located either within the structure of the pylon (for the centre two fasteners 50) or external to the pylon adjacent a lower surface of each bracket 51 (for the outer two fasteners 50). For all of the fasteners 50, no access to the interior of the wing is required in order to install them. As discussed above, this has significant advantages for simplifying and speeding up the aircraft assembly process.

An upper arm of each fitting 40 (that is, the arm of each fitting 40 which is parallel to the spar web 41) is fixedly attached to the spar web 41 by a set of first fasteners 49*a*. The exact number and arrangement of first fasteners 49*a* used to attach each fitting 40 to the spar web 41 may be selected in dependence on the requirements of the particular application. Each first fastener 49*a* extends through the upper arm of the respective fitting 40, the spar web 41 and the second reinforcing plate 48, and is configured (e.g. by comprising a nut adjacent the rear face of the second reinforcing plate 48) to prevent separation of the fitting 40, spar web 44- and second reinforcing plate 48 along the axial direction of the first fastener 49*a*.

The lower arm of each fitting 40 (that is, the arm of each fitting 40 which is parallel to the spar lower flange 43) is fixedly attached to the lower flange 43 by a set of second fasteners 49*b*. The exact number and arrangement of second fasteners 49*b* used to attach each fitting 40 to the lower flange 43 may be selected in dependence on the requirements of the particular application. Each second fastener 49*b* extends through the lower arm of the respective fitting 40, the lower flange 43, lower cover and the first reinforcing plate 46, and is configured (e.g. by comprising a nut adjacent the lower arm of the fitting 40) to prevent separation of the fitting 40, lower flange 43, lower cover and first reinforcing plate 46 along the axial direction of the second fastener 49*b*.

In the illustrated example, the second fasteners 49*b* are comprised in a set of fasteners that fasten together the lower cover, lower flange 43, and first reinforcing plate 46. This set of fasteners further comprises third fasteners 49*c* which do not extend through the fittings 40, but are otherwise the same as the second fasteners 49*b*. The set of second and third fasteners 49*b*, 49*c* may be arranged as two staggered rows extending parallel to the long axis of the front spar. This staggered arrangement can clearly be seen in FIG. 4*b* and may be equivalent to known arrangements of fasteners for attaching a lower cover to a spar lower flange.

Figure 5:
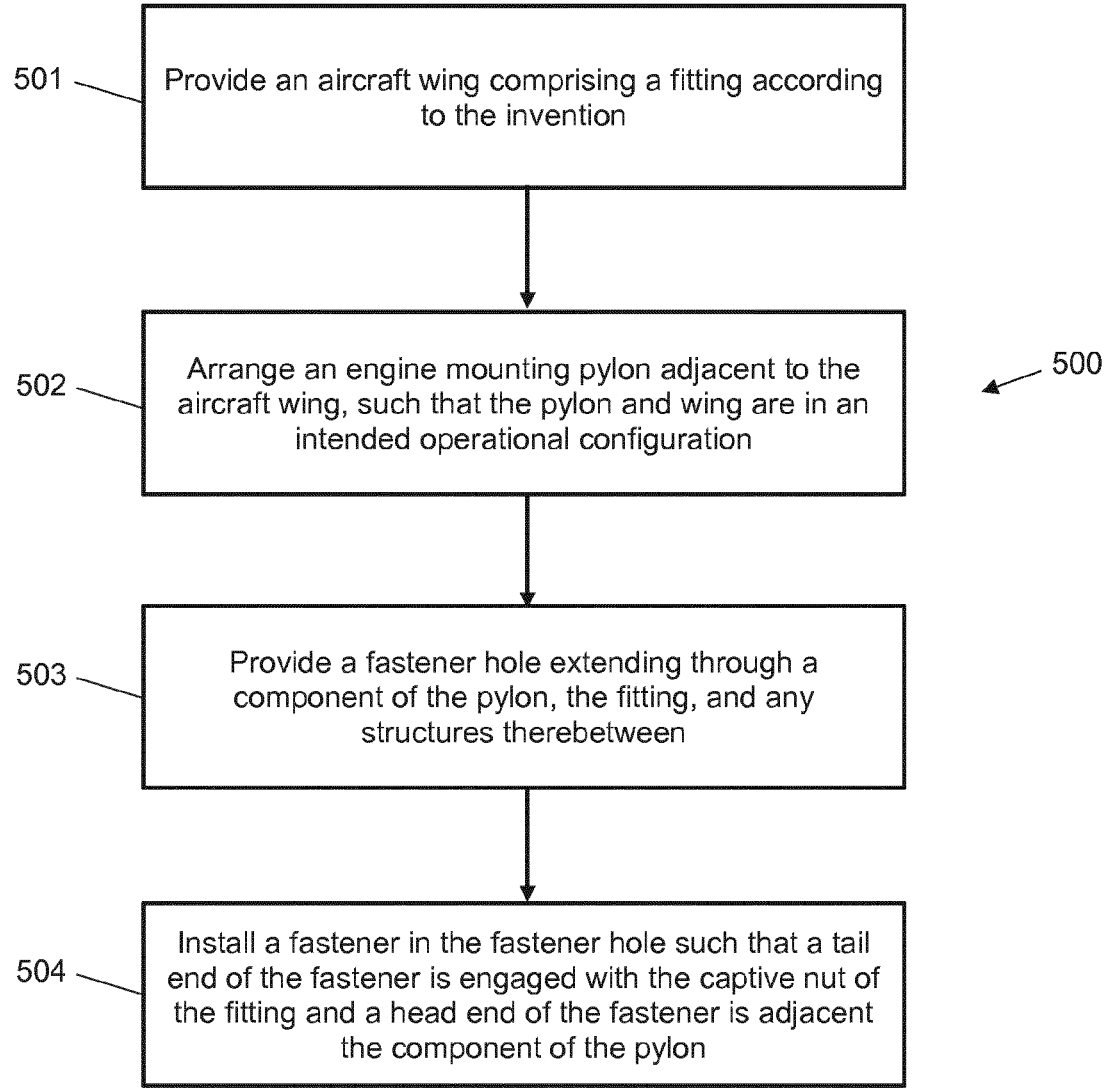
FIG. 5 is a flow chart illustrating an example method of attaching an engine mounting pylon to an aircraft wing.

FIG. 5 is a flow chart illustrating an example method 500 of connecting an aircraft wing and an engine mounting pylon, using one or more fittings according to the invention. For example, the method 500 may be used as part of a process of mounting the example pylon of FIGS. 4*a*-*c* to the example wing box of FIGS. 4*a*-*c*.

In a first block 501, an aircraft wing is provided. The aircraft wing comprises a fitting according to the invention, e.g. the example fitting 10 or the example fitting 40 described above. The aircraft wing comprises a structural wing box and the fitting is fixedly attached to one or more components of the wing box. The aircraft wing may further comprise one or more reinforcing structures to which the fitting is fixedly attached. The aircraft wing may be provided in a substantially complete state such that little or no further work to join structural components of the wing or install systems into the wing is required before the aircraft can be operated. The aircraft wing may additionally comprise one or more of: a fixed leading edge structure, a fixed trailing edge structure, one or more moveable devices, at the time of performing block 501.

In a second block 502, an engine mounting pylon is arranged adjacent to the aircraft wing, such that the pylon and wing are in an intended operational configuration. Arranging the pylon adjacent the aircraft wing may be performed in any suitable manner known in the art, e.g. using one or more jigs. During the performing of block 502 the engine mounting pylon is in a partially open state, so that access to the interior space of the pylon is possible. In particular, access to the lower surface of a top spar of the pylon is possible. The pylon may comprise one or more brackets fixedly attached to the exterior of the pylon structure. Such brackets may function to provide a wider attachment region for attaching the pylon to the wing.

In a third block 503, a fastener hole is provided. The fastener hole extends through a component of the pylon (e.g. the pylon top spar or a bracket fixedly attached to the exterior of the pylon), the fitting, and any structures therebetween. Structures between the pylon component and the fitting may include, for example, one or more components of the structural wing box, and one or more reinforcing structures. The fastener hole is sized to accommodate the shaft of a fastener intended to be used to attach the pylon to the wing. The fastener hole may be provided by creating the fastener hole, using any suitable technique known in the art, after the pylon has been arranged adjacent the wing. In such examples, creation of the fastener hole may be performed by a tool located within the pylon structure. In other examples the fastener hole may already exist in one or more of the structures which the fastener hole extends through, before the pylon is arranged adjacent the wing box. For example, part of the fastener hole may be created through the structures comprised in the aircraft wing (that is, the fitting, one or more of the structures forming the wing box, and/or a reinforcing structure) at the time of assembling the wing.

In the fourth block 504, a fastener is installed in the fastener hole such that a tail end of the fastener is engaged with the captive nut of the fitting and a head end of the fastener is adjacent the component of the pylon. The fastener may comprise a tension stud. The fastener is installed in the fastener hole from within the pylon structure. Installing the fastener may comprise applying a torque to the fastener head to rotate the fastener relative to the captive nut of the fitting, until a desired torque level is reached. Applying a torque to the fastener head may be performed using a tool located within the pylon structure.

The engine mounting pylon may be attached to the wing using multiple fittings according to the invention, in which case the method 500 is performed in respect of each fitting. The method 500 may be performed simultaneously in respect of each fitting, or sequentially, or a combination of simultaneously and sequentially.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A fitting for connecting a first aircraft structure to a second aircraft structure, the fitting comprising:
   a first substantially planar surface;
   a second substantially planar surface;
   a body connecting the first surface to the second surface such that the first surface is at an angle of less than or equal to 90° to the second surface;
   a cavity in the body configured to retain a captive nut;
   wherein the cavity is configured such the captive nut retained therein is adjacent the first surface and the second surface;
   wherein the second surface includes a bore extending therethrough and connected to the cavity;
   a fastener including a stem extending through the bore in an axial direction of the stem, wherein the fastener passes through a first intermediate structure and a second intermediate structure, wherein the first intermediate structure is a cover panel of a wingbox, and the second intermediate structure is a reinforcing structure, wherein the first intermediate structure contacting the second surface at one side, and the second intermediate structure contacting the second aircraft structure at a second side; and
   a captive nut disposed in the cavity in a direction substantially perpendicular to the axial direction, and wherein the captive nut retains the fastener.

2. The fitting of claim 1, wherein the first surface is at an angle of less than or equal to 85° to the second surface.

3. The fitting of claim 1, wherein the cavity is configured such that a captive nut retained therein is substantially the same distance from the first surface as from the second surface.

4. The fitting of claim 1, wherein the cavity is configured such that the distance between a captive nut retained therein and the first surface and the distance between the captive nut retained therein and the second surface are each less than the diameter of the stem of the fastener.

5. The fitting of claim 1, wherein one or both of the first surface and the second surface comprises mounting features for facilitating attachment of the fitting to the first or second aircraft structure.

6. The fitting of claim 5, wherein the mounting features comprise fastener holes.

7. The fitting of claim 1, further comprising a captive nut retained in the cavity.

8. The fitting of claim 7, wherein the captive nut is a barrel nut.

9. The fitting of claim 1, wherein the fitting is configured to be provided in a corner between a forward-facing surface of a front spar of an aircraft wing and forwardly-extending structure of the aircraft wing, such that the first substantially planar surface is in contact with the forward-facing surface of the front spar and the second substantially planar surface is in contact with the forwardly extending structure.

10. An assembly, comprising:
    a first structure;
    a second structure;
    a bracket comprising a first arm fixedly attached to the first structure; a second arm connected to the first arm such that an angle of less than or equal to 90° is enclosed therebetween;
    a fastener extending through the second structure in an axial direction;
    a captive nut retained between the first arm and the second arm, wherein the captive nut is oriented in a direction substantially perpendicular to the axial direction;
    wherein the fastener is engaged with the captive nut to prevent movement of the first structure and the second structure along the axial direction of the fastener; and
    a first intermediate structure and a second intermediate structure, wherein the first intermediate structure is a cover panel of a wingbox, and the second intermediate structure is a reinforcing structure, wherein the first and the second intermediate structures contact each other, wherein the first intermediate structure contacts the second arm of the bracket at one side, and wherein the second intermediate structure contacts the second structure at a second side, and wherein the fastener additionally passes through the one or more intermediate structures.

11. The assembly according to claim 10, wherein the captive nut is disposed in a corner of the bracket where the first arm meets the second arm.

12. The assembly according to claim 10, wherein one or both of the first arm and the second arm is attached to the first structure by one or more of the fasteners.

13. The assembly according to claim 10, wherein the bracket is a fitting comprising:
- a first substantially planar surface;
- a second substantially planar surface;
- a body connecting the first surface to the second surface such that the first surface is at an angle of less than or equal to 90° to the second surface; and
- a cavity in the body configured to retain a captive nut;
- wherein the cavity is configured such that the captive nut retained therein is adjacent the first surface and the second surface.

14. An aircraft comprising an assembly according to claim 10.

15. The aircraft according to claim 14, wherein the reinforcing structure is an engine mounting pylon.

16. The aircraft according to claim 15, wherein the engine mounting pylon and the wing box are close-coupled.

17. The aircraft according to claim 15, further comprising an Ultra High-Bypass Ratio engine mounted on the engine mounting pylon.

* * * * *